United States Patent
Rizzo et al.

(10) Patent No.: US 7,707,216 B2
(45) Date of Patent: Apr. 27, 2010

(54) DATA SORTING APPARATUS WITH QUERYING MECHANISM AND METHOD OF OPERATION

(75) Inventors: Davide Rizzo, San Diego, CA (US); Osvaldo Colavin, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 702 days.

(21) Appl. No.: 10/267,402

(22) Filed: Oct. 8, 2002

(65) Prior Publication Data

US 2004/0068500 A1    Apr. 8, 2004

(51) Int. Cl.
*G06F 7/00*  (2006.01)
*G06F 17/30* (2006.01)

(52) U.S. Cl. .................... 707/752; 707/769
(58) Field of Classification Search ............ 707/7; 712/300; 710/8, 104; 395/828, 284, 822; 708/207
See application file for complete search history.

(56) References Cited

U.S. PATENT DOCUMENTS

| | | | | |
|---|---|---|---|---|
| 4,799,152 | A * | 1/1989 | Chuang et al. | 707/7 |
| 5,247,688 | A * | 9/1993 | Ishigami | 707/7 |
| 5,386,578 | A * | 1/1995 | Lin | 712/300 |
| 5,748,980 | A * | 5/1998 | Lipe et al. | 710/8 |
| 6,182,206 | B1 | 1/2001 | Baxter | |
| 6,230,307 | B1 | 5/2001 | Davis et al. | |
| 6,850,895 | B2 * | 2/2005 | Brodersen et al. | 705/9 |

FOREIGN PATENT DOCUMENTS

JP         2001051827 A  *  2/2001

OTHER PUBLICATIONS

Alexandro M.S. Adario et al., "Dynamically Reconfigurable Architecture for Image Processor Applications," Proceedings of the 36th ACM/IEEE Conference on Design Automation, Jun. 1999, pp. 623-628.
Kiarash Bazargan et al, "A C to Hardware/Software Compiler," 2000 IEEE Symposium on Field-Programmable Custom Computing Machines, Apr. 17, 2000, pp. 331-332.
Steffen Kohler et al., "Improving Code Efficiency for Reconfigurable VLIW Processors," Proceedings of the International Parallel and Distributed Processing Symposium, Apr. 19, 2002, pp. 153-159.
Sung-Whan Moon et al., "Scalable Hardware Priority Queue Architectures for High-Speed Packet Switches," IEEE Transactions on Computers, vol. 49, No. 11, Nov. 2000, pp. 1215-1227.
Ed D. Knuth, "Sorting and Searching—The Art of Computer Programming, Passage Text," vol. 3, 1988, pp. 406-419.

* cited by examiner

*Primary Examiner*—John E Breene
*Assistant Examiner*—Giovanna Colan
(74) *Attorney, Agent, or Firm*—Lisa K. Jorgenson; William A. Munck

(57) ABSTRACT

A data sorter includes a storage sorter that sorts a data set according to a defined criteria; and a query mechanism that receives intermediate sorted data values from the storage sorter and compares the intermediate sorted data values to a key value. The storage sorter includes a priority queue for sorting the data set. The priority queue has M processing elements. The query mechanism receives the intermediate sorted data values from the M processing elements. The query mechanism includes a plurality of comparison circuits, each of which is capable of detecting whether one of the intermediate sorted data values is equal to the key value or, if no match exists, extracting a minimal value greater than (or less than according to a defined criteria) the key value.

22 Claims, 16 Drawing Sheets

DATA SORTING APPARATUS WITH QUERYING MECHANISM AND METHOD OF OPERATION

TECHNICAL FIELD OF THE INVENTION

The present invention is generally directed to processing systems and, more specifically, to a data sorter for use in a data processor.

BACKGROUND OF THE INVENTION

The speed, power, and complexity of integrated circuits, such as microprocessor chips, random access memory (RAM) chips, application specific integrated circuit (ASIC) chips, and the like, have increased dramatically in the last twenty years. More recently, these increases have led to development of so-called system-on-a-chip (SoC) devices. A SoC device allows nearly all of the components of a complex system, such as a cell phone or a television receiver, to be integrated onto a single piece of silicon. This level of integration greatly reduces the size and power consumption of the system, while generally also reducing manufacturing costs.

A recent trend in SoC devices and other large-scale integrated circuits is towards the adoption of reconfigurable processing devices. A reconfigurable processor is typically implemented as a fixed data path coupled to a dynamically reconfigurable unit (RU). There is not yet, however, a widely adopted reference architecture for reconfigurable devices because of their relative novelty. Research in the field is quite active. Among the academic projects, a few notable architectures worthy of mention are GARP at Berkeley, Chimaera at Northwestern University, and Piperench at Carnegie Mellon. CARP is a coprocessor attached to a host processor to speed up loop implementations, extracted and mapped automatically from C code by its compiler. Chimaera is a tightly coupled reconfigurable functional unit in a conventional processor data path that implements custom instructions of up to nine (9) input operands. Piperench is an attached processor that implements entire stream-based media applications, implementing the concept of a virtual pipeline. Each of these proposals has a different organization, programming model and interface to the processor.

An important performance parameter of any reconfigurable processing device is the management of hardware resources of the processor. The management of a limited set of hardware resources involves the allocation of such resources to a set of requested configurations (requesters). A resource manager is usually added as a part of a data processing system to act as the interface between the resources and the requesters. The basic tasks performed by a resource manager are:

1) searching for the best fitting (or optimal) available set of resources to fulfill the request. This involves data structures (probably sorted) that must be maintained and that contain updated information about the status of the resources at every instant;

2) modifying such data structures to reflect changes in terms of new request allocations and terminations; and 3) executing actions that effectively allocate and setup the resources to the requester.

These operations often represent an overhead in the data processing system, because the managed resources are not available to perform useful work until the resource manager has completed the allocation tasks. Therefore, the time spent performing these steps should be minimized to provide the highest throughput and utilization of the system resources.

Therefore, there is a need in the art for improved reconfigurable processing devices. In particular, there is a need for an improved resource manager for use in a reconfigurable processing device.

SUMMARY OF THE INVENTION

The present invention addresses the problem of efficiently managing a sorted data structure (on a key field k) and efficiently extracting information associated with a required key $k_q$, if existing in the stored data set, or extracting the data value associated to the closest (either in ascendant or descendant order) key $k_f$. The efficiency is considered in terms of response time and hardware resources needed.

The present invention is an efficient hardware solution to solve the problem of management and query of a sorted data set. It essentially consists of a fully associative memory, modified to take into consideration the need to sort the stored data on a specified key field k. The structure is able to store a set of up to N values and to sort or extract the information associated to a specified value n in the key field.

To address the above-discussed deficiencies of the prior art, it is a primary object of the present invention to provide a data sorting apparatus for use in a data processing system. According to an advantageous embodiment of the present invention, the data sorting apparatus comprises: 1) a storage sorter capable of sorting a data set according to a defined criteria; and 2) a query mechanism capable of receiving a plurality of intermediate sorted data values from the storage sorter and comparing the intermediate sorted data values to at least one key value.

According to one embodiment of the present invention, the storage sorter comprises a priority queue for sorting the data set, wherein the priority queue comprises M processing elements.

According to another embodiment of the present invention, the query mechanism receives the plurality of intermediate sorted data values from a subset of the M processing elements in the priority queue.

According to still another embodiment of the present invention, the query mechanism comprises a plurality of comparison circuits, each of the comparison circuits capable of detecting if one of the plurality of intermediate sorted data values is equal to the at least one key value.

According to yet another embodiment of the present invention, each comparison circuit is capable of detecting if one of the plurality of intermediate sorted data values is greater than the at least one key value.

According to a further embodiment of the present invention, the query mechanism further comprises a plurality of priority determination circuits, each of the priority determination circuits capable of determining only one resulting match according to a defined optimality criteria.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
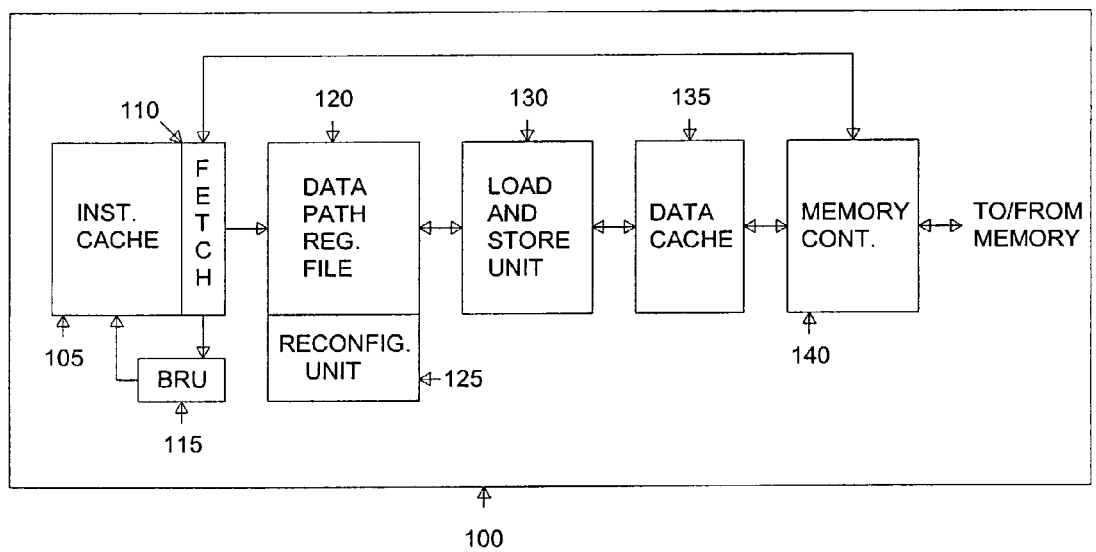
FIG. 1 illustrates an exemplary data processor that contains a reconfigurable unit according to an exemplary embodiment of the present invention.

FIG. 1 illustrates exemplary data processor 100, which contains reconfigurable unit 125 according to an exemplary embodiment of the present invention. Data processor 100 also is similar in architecture to conventional (i.e., prior art) systems containing reconfigurable units. Data processor 100 comprises a fixed data path containing instruction cache 105, fetch unit 110, branch unit (BRU) 115, data path register file 120, load and store unit 130, data cache 135, and memory controller 140. The fixed data path is coupled to reconfigurable unit 125.

The ultimate goal for reconfigurable unit 125 is to enable a given application to execute more efficiently and with higher throughput. According to an exemplary embodiment of the present invention, reconfigurable unit 125 relies on conventional SRAM-based programmable logic technology and may be implemented as a regular grid of computing elements, routing channels, and logic switches. Each of these resources is controlled by an associated set of configuration bits stored in a configuration memory. At any specific time instant, reconfigurable unit 125 implements a function that depends on the current configuration loaded in the configuration memory. Because of the SRAM programmable technology, the functionality can be altered at any moment by simply loading a new and different set of configuration bits.

This approach gives the architecture a better trade-off in flexibility and performance compared to general purpose processor solutions. For example, the present invention allows efficient implementation of a range of applications from a common domain (such as image processing or multimedia domains). The present invention enables the computing resources to be efficiently adapted to match the application requirements, instead of forcing the application to match a general set of computing resources. In this scenario, the partitioning of the application between the fixed data path and reconfigurable unit 125, the synchronization, resource management and allocation of reconfigurable unit 125 are critical to program efficiency.

Figure 2:
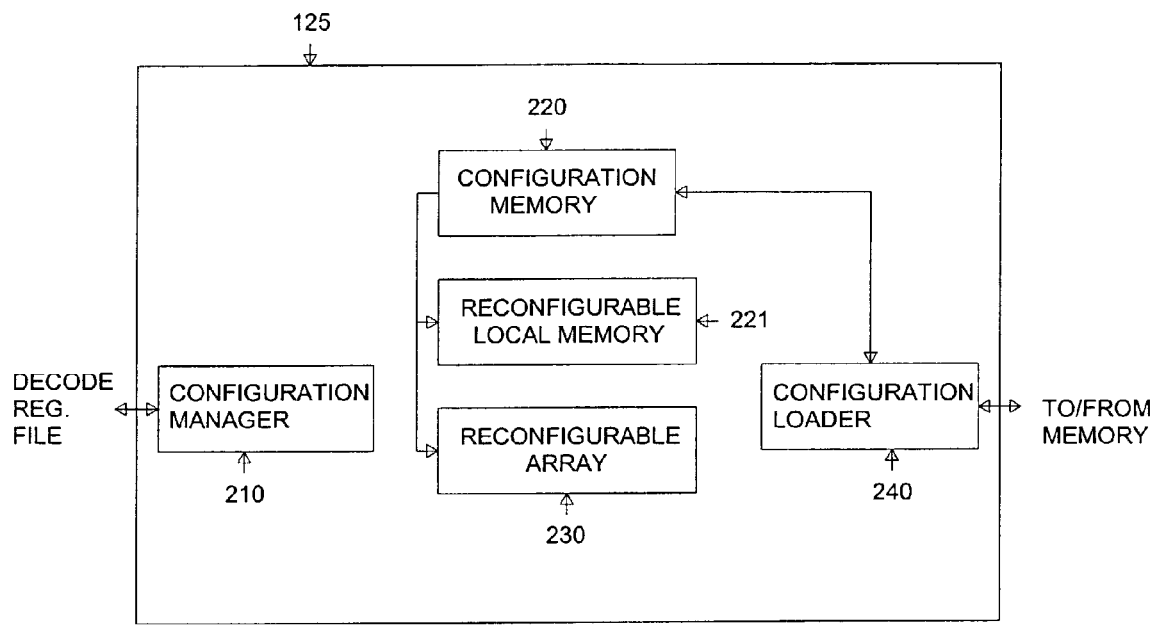
FIG. 2 illustrates the reconfigurable unit in FIG. 1 in greater detail according to one embodiment of the present invention.

FIG. 2 illustrates reconfigurable unit 125 according to one embodiment of the present invention. Reconfigurable unit 125 is similar in architecture to conventional reconfigurable units. Reconfigurable unit 125 comprises configuration manager 210, configuration memory 220, reconfigurable local memory bank 221, reconfigurable array 230, and configuration loader 240.

Configuration manager 210 is the interface with the conventional CPU. Configuration manager 210 accepts requests for configuration execution and feeds back the corresponding results. Configuration manager 210 supervises the configuration allocations in order to program the functionality of reconfigurable unit 125 is and stalls data processor 100 if a required configuration is not currently loaded and available. In such cases, configuration loader 240 is activated to serve the request. Depending on the coupling mechanism, reconfigurable unit 125 may or may not have access to fixed data path register file 120.

Configuration loader 240 is responsible for configuration loading and caching, acting as a direct memory access (DMA) controller. The load process may be hidden if extra resources are available, such as a multi-context configuration memory, for example. Reconfigurable array 230 is the data path where operators are dynamically built and removed, as dictated by the loaded configurations. In a conventional system, reconfigurable array 230 is a uniform grid of computing cells, which has the advantage of simplifying the configuration allocation. However, a less regular but more constraining organization may be implemented, if specific resource requirements are known. Each cell is configured through a set of bits associated with each control point, specifically in the functionality carried out in the interconnections of inputs and outputs.

Reconfigurable local memory 221 may be separated from, or merged into reconfigurable array 230 in order to implement local register files that store inputs and intermediate results of computations. Configuration memory 220 stores the configuration bits which define the functionality and the data connections. Configuration memory 220 may have many configuration planes that store more than one set of configuration bits for each control point in the array. This enables reconfigurable unit 125 to perform a fast context switch between different loaded configurations. Also, configuration caches may be used to store the most recently used configurations and configuration pre-fetch techniques may be used to reduce the reconfiguration overhead penalties.

Figure 3:
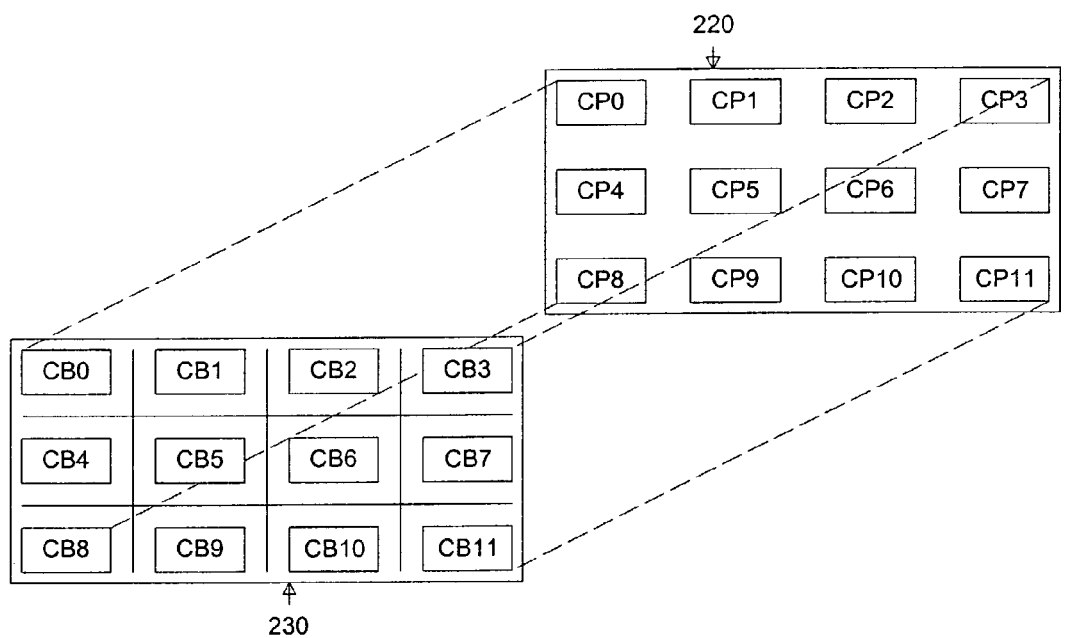
FIG. 3 illustrates a reconfigurable array comprising a regular grid of configurable blocks and corresponding configuration pages according to one embodiment of the present invention.

FIG. 3 illustrates reconfigurable array 230 according to one embodiment of the present invention. Without a loss of generality, reconfigurable array 230 may be implemented as a regular structure of cells. As depicted in FIG. 3, reconfigurable array 230 comprises a regular grid of configurable blocks (CBs), including CB0-CB11, and corresponding configuration pages (CPs), including CP0-CP11 in configuration memory 220. A hierarchy of macrocells and slices may be introduced for reconfigurable unit 125, defining the granularity of the reconfiguration at cell, macrocell or slice level. The minimum unit that may be independently reconfigured is called a configuration page (CP). In the current description, each configuration is allocated only in contiguous configuration pages. More general allocations may be made at the expense of greater complexity in configuration manager 210 and configuration memory 220.

Configuration manager 210 is aware of the status of reconfigurable unit (RU) 125, including, for example, the number of loaded configurations and the locations of those configurations in reconfigurable array 230. Configuration manager 210 is essentially a resource manager that satisfies different execution requests, appropriately allocating resources from the limited amount available in reconfigurable array 230. To accomplish this task, configuration manager 210 may maintain some type of data structure, such as a configuration allocation map, to reflect changes in the RU status. A configuration allocation map stores the current active configurations of reconfigurable unit 125, including the addresses of the initial and final configuration pages for each configuration. Another table stores the intervals of contiguous empty configuration pages. From the resource management point of view, configuration manager 210 shares many similarities with a modern multitasking operating system kernel.

When the CPU requests execution of an operation or task in reconfigurable array 230, configuration manager 210 determines whether the necessary resources for the execution are available, if the operation configuration is not yet loaded in reconfigurable array 210. In such a situation, configuration manager 210 searches for the minimal set of free contiguous configuration pages in order to load the required operation configuration bits.

As previously noted, it is desirable to have contiguous pages to simplify the allocation management. This implies the use of an ordered data structure accessible to configuration manager 210, to be queried every time an operation that is not resident must be allocated and configured in reconfigurable array 230. The set of free configuration pages should be the minimal available value greater than the requested quantity (the exact value gives the optimum value). This would guarantee an optimal usage of the limited resources and would also guarantee the availability of reconfigurable unit 125 to the maximum number of reconfigurable operations.

According to an advantageous embodiment of the present invention, a straightforward implementation of the allocation algorithm may be performed completely in software as an interrupt service routine (ISR) executed only in the data processor without support from reconfigurable unit 125. The ISR may be triggered through an interrupt generated by reconfigurable unit 125 when a required configuration is not resident. In this case, the data structure would be stored in main memory and configuration manager 210 would have a lower complexity.

The ISR performs a search in the data structure to find the best fitting set of available pages. This solution is inefficient and with low performances in terms of execution and response time, since it is time consuming to access the main memory, to perform comparisons and update the data structure. Along with the querying mechanism, configuration manager 210 also updates the data structure when an operation or task terminates execution, releasing the previously allocated configuration memory pages. This solution is inefficient because it gives a low utilization factor of the processor to execute application code, having a high overhead in the code run to correctly manage reconfigurable unit 125.

A possible option to improve the performances (response time and utilization factor) is to adopt a mixed hardware-software solution with some dedicated circuitry to store the data structure so to allow efficient sorting and querying. In this case a fully associative memory can be adopted. This solution guarantees a one-step search if the data is known to be in the data set but it fails if the data is not present, therefore requiring more search steps, with guess on the key, if a result must always be obtained as the query outcome.

The data set being considered is formed by values representing contiguous sets of empty configuration memory pages (key field k, with another field $A_k$ containing the address of the starting page). An optimal management would search exactly for a specified value p of pages (query key $k_q$), to avoid the inefficiency of allocating more pages than needed. If the value p does not exist in the data set, this solution requires querying the table for the value p+1 and so on, until a value is finally found. This could be time-consuming, especially if the closest found value F (with key $k_f$) is much greater than p.

Figure 4:
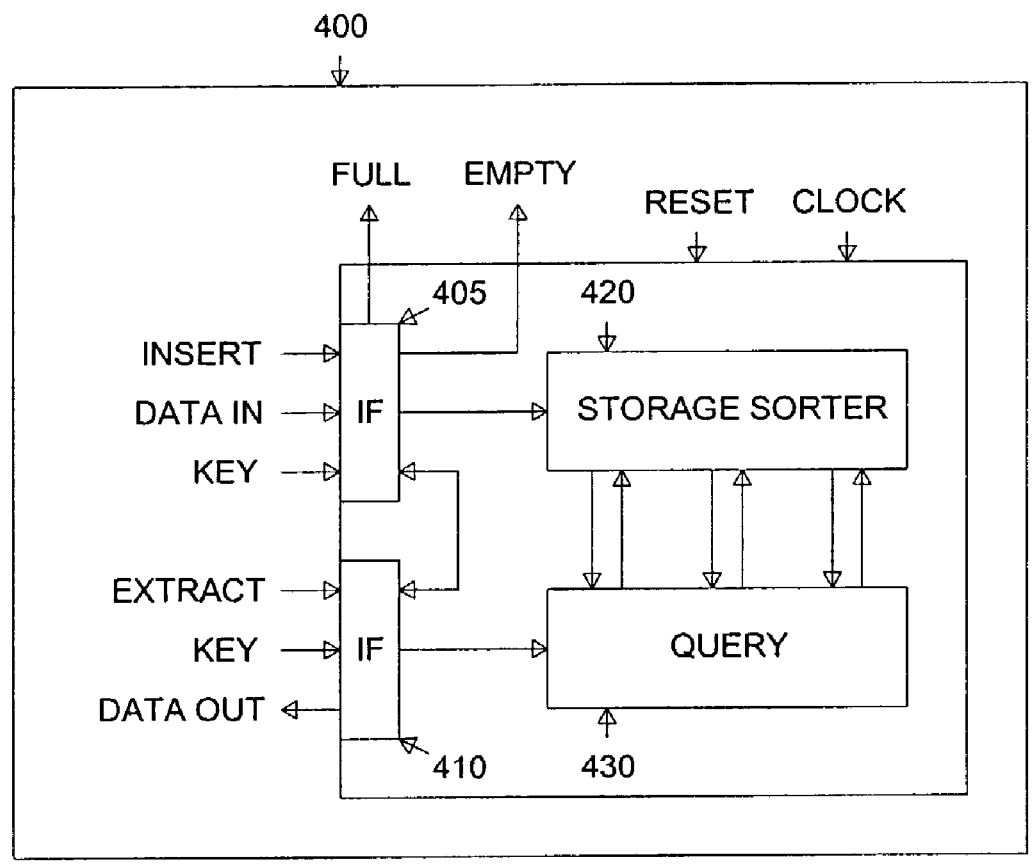
FIG. 4 illustrates a sorter device that includes a query mechanism according to one embodiment of the present invention.

FIG. 4 illustrates sorter device 400, which includes query mechanism 430 according to an exemplary embodiment of the present invention. Sorter device 400 comprises insert interface 405, extract interface 410, storage sorter 420 and query block 430. Storage sorter 420 provides storage for the data set to be sorted on a specified key field (decided and fixed once at design time) and query block 430 extracts the required information. The interface to the external world is defined on the basis of the operation to be performed. Insert interface 405 comprises ports for the key value, the remaining associated data values (DATA IN), and an insert flag signal. Extract (or query) interface 410 provides ports for the key to be searched, the values extracted (DATA OUT), and an extract flag signal.

The operating usage is based on a simple model of insertion followed by query and extractions. The queries cannot exceed the number of insertions, so that the following always holds true:

$N_{extractions} \leq N_{insertions}$

A signal line connecting insert interface 405 and extract interface 410 forces this operating model by disabling any request for extraction if it exceeds the number of insertions previously made.

According to an advantageous embodiment of the present invention, the extraction operation is destructive, meaning that a data set returned from the query operation is physically removed from storage sorter 420. In an alternate embodiment, the present invention may be adapted to avoid the destructiveness in a modification that is straightforward and less expensive in terms of hardware resources.

Storage sorter 420 is basically a memory with an integrated sorter that keeps a data set sorted on a specified key value. Storage sorter 420 is based on a systolic structure that implements a priority queue of M cells (or processing elements). Such a systolic structure is described in C. Leiserson, "Systolic Priority Queues", Tech Report CMU-CS-79-115, Carnegie-Mellon University, Pittsburgh, Pa., April 1979. This type of systolic structure solves essentially the problem of extracting at a certain time instant the maximum (or the minimum, depending on a design time choice) of a given data sequence.

The present invention modifies this structure to also permit the extraction of any value from inside the priority queue, while maintaining the sorting mechanism consistency for subsequent insertion and extraction operations. In the following discussion, a structure to sort a given data set in descending order is described. Analogous considerations apply for a structure which sorts in ascending order. A sorting device according to the principles of the present invention relies on the previously described insertion and extraction mechanism. Given a sequence of N data values, the insertion is sequential, once at a time in consecutive cycles.

Figure 5:
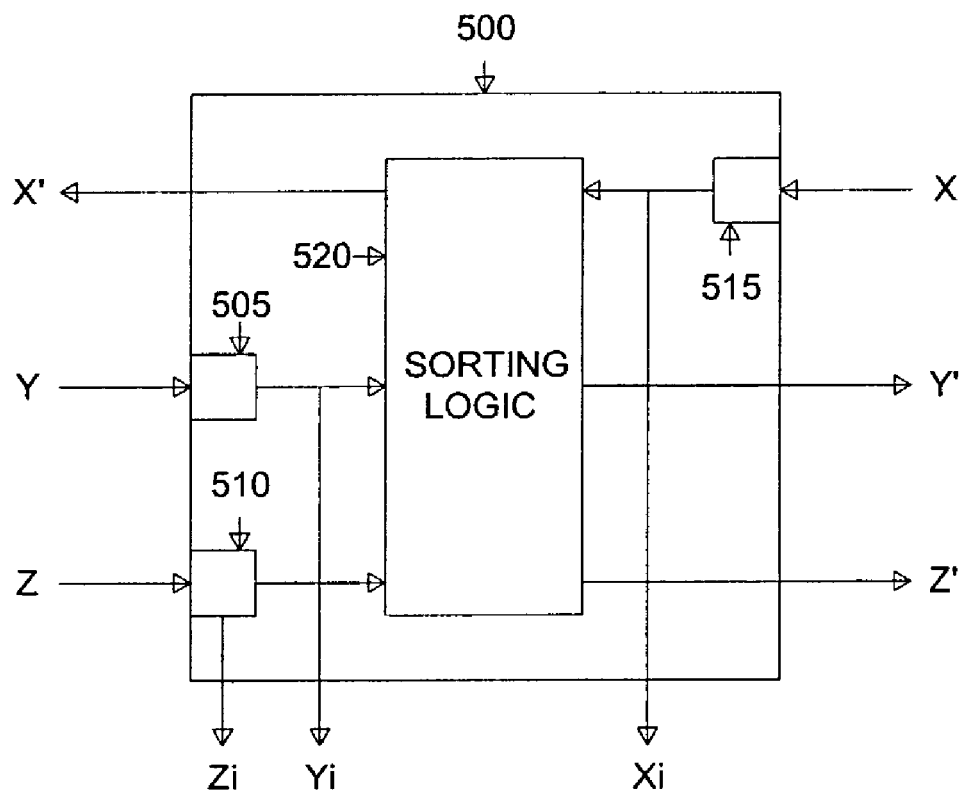
FIG. 5 illustrates a basic processing element (PE) of the queue according to one embodiment of the present invention.

FIG. 5 illustrates basic processing element (PE) 500 of the priority queue in storage sorter 420 according to one embodiment of the present invention. Processing element 500 comprises input registers 505, 510 and 515, and sorting logic block 520. Processing element 500 comprises a three input port (X, Y and Z), six output port (X', Y', Z', Xi, Yi, and Zi) device that sorts the three input ports and routes them to the output ports such that X' gets the maximum value, Y' gets the median value, and Z' gets the minimum of the three input ports. The three remaining output ports (Xi, Yi, and Zi) transfer the state of processing element 500 to query block 430. Input registers 505, 510 and 515 buffer the input ports. These registers comprise the key field to be used for the sorting and the associated values, which need to be retrieved later.

Figure 6:
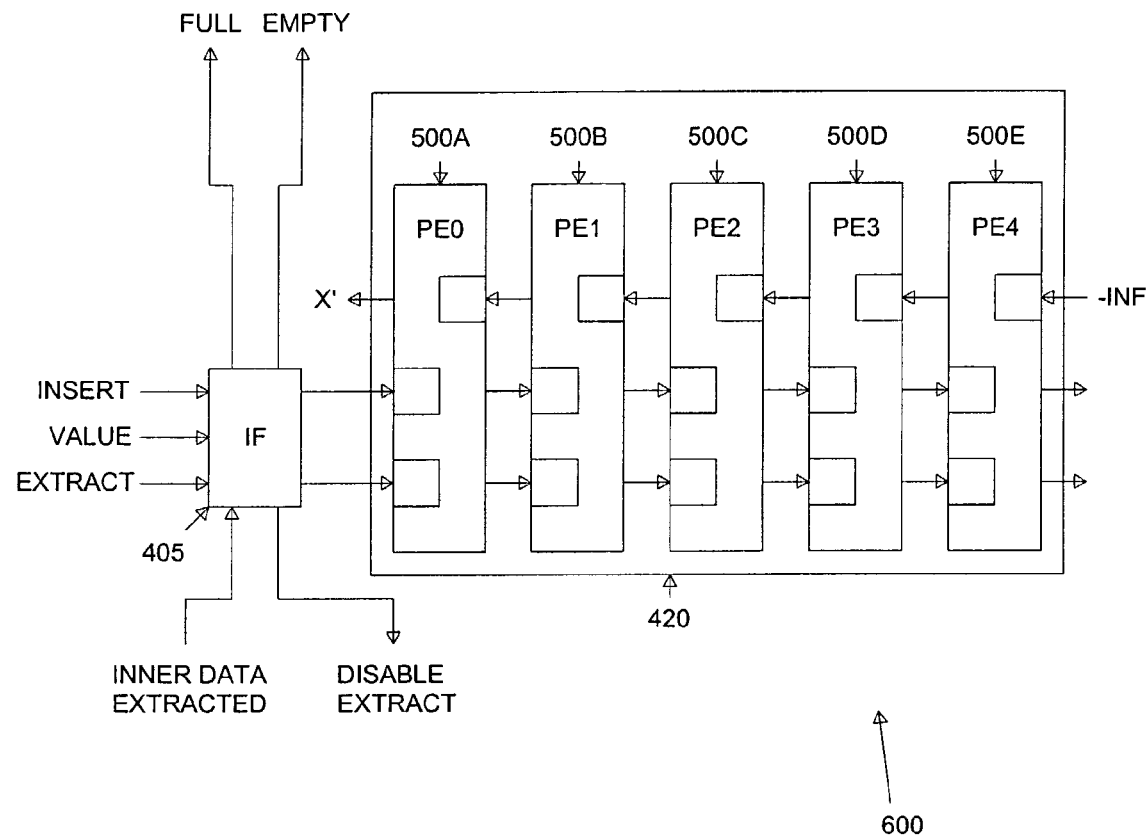
FIG. 6 illustrates the overall queue with M stages comprised of the exemplary processing elements according to one embodiment of the present invention.

FIG. 6 illustrates priority queue 600, which has M cells (or stages) comprised of processing element (PE) 500, in storage sorter 420 according to one embodiment of the present invention. Priority queue 600 is coupled to interface (IF) logic block 405 and contains exemplary processing elements 500A, 500B, 500C, 500D and 500E (to simplify the description, it is assumed M=5). Processing elements 500A, 500B, 500C, 500D and 500F are sequentially labeled Processing Element 0 (PE0), Processing Element 1 (PE1), Processing Element 2 (PE2), Processing Element 3 (PE3), and Processing Element 4 (PE4), respectively.

Two basic operations can be performed on priority queue 600, by interfacing with the leftmost processing element 500 (i.e., PE0): 1) an INSERT operation to insert a new value to be sorted; and 2) an EXTRACT operation to extract the maximum of the current data set. In the exemplary embodiment of the present invention, this latter operation is not implemented and the extraction is performed through query block 430. Interface logic block 405 contains a counter to keep track of the insertions and extractions made in order to disable further extractions when the structure is empty or to signal when the structure is full and overflowing. Interface logic block 405 also receives notice when an inner value has been extracted from query block 430, in order to update the counter and re-adjust the state of priority queue 600 and maintain a coherent data sort.

It is necessary to represent two symbolic values in the key field data range—specifically a representation for positive infinity (+INF) and negative infinity (−INF) is required. It is assumed the key field to be represented with B bits in two's-complement system and to interpret the greatest positive number ($2^{B-1}-1$) as +INF and the smallest negative number ($-2^{B-1}$) as −INF. The key value has therefore a range of [$-2^{B-1}+1, 2^{B-1}-2$], boundary included. Of course, in alternate embodiments of the invention, other choices could be adopted, such as adding extra bit lines (separate from the key) to assert the validity of the key word or an infinite value. All of the internal values are initialized to INF, with a RESET operation. Furthermore, any of the internal registers can be reset during the execution by a reset signal triggered from query block 430.

Figure 7:
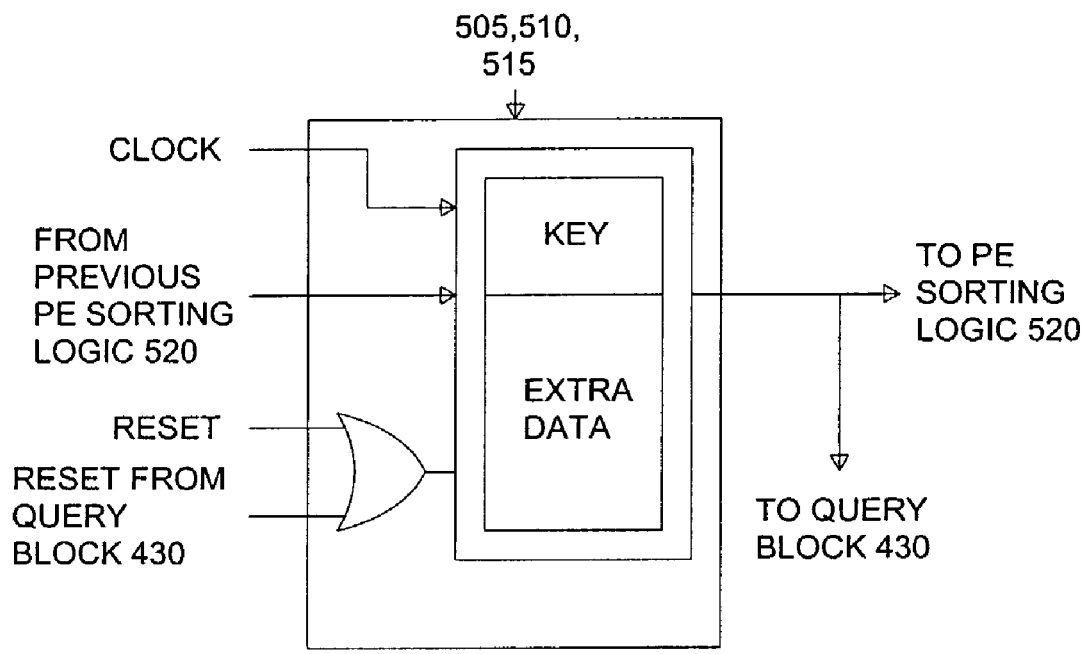
FIG. 7 illustrates the structure of the internal registers according to one embodiment of the present invention.

FIG. 7 illustrates the structure of internal registers 505, 510, and 515 according to one embodiment of the present invention. The X input port of the last of the N+1 cells ($PE_N$) is always equal to −INF, so that the Z' output port is always −INF and there is an overflow (more values inserted than what could be stored and sorted) if Y' is different from −INF (or the last PE has an input different from −INF on the Z line). For a given maximum of N insertions, the overflow problem can be avoided by using M=N+1 processing elements 500.

Each processing element 500 is active every other clock cycle. Execution starts with processing elements 500 in even positions (i.e., even cell=2i, for $0 \leq 2i < M$, where i=0, 1, 2, ... ) followed by processing elements 500 in odd positions (i.e., odd cell=2i+1, for $0 \leq 2i+1 < M$, where i=0, 1, 2, ... ).

The utilization factor for each cell is 50%, with one insertion or extraction operation potentially performed every two cycles. In alternate embodiments, one possible enhancement may consist of merging cells from even (2i) and odd (2i+1) positions in order to reuse the same comparison logic on different registers sets, thereby reaching a utilization of 100%. Another improvement may involve using both clock edges, wherein even cells are activated on the positive edges and odd cells are activated on negative edges.

The original priority queue 600 is supposed to be used on every cycle with either an insertion or an extraction of the current maximum. It is important to keep priority queue 600 processing, without any new insertion or extraction at the interface of PE0, when the internal state has been modified.

Figure 8:
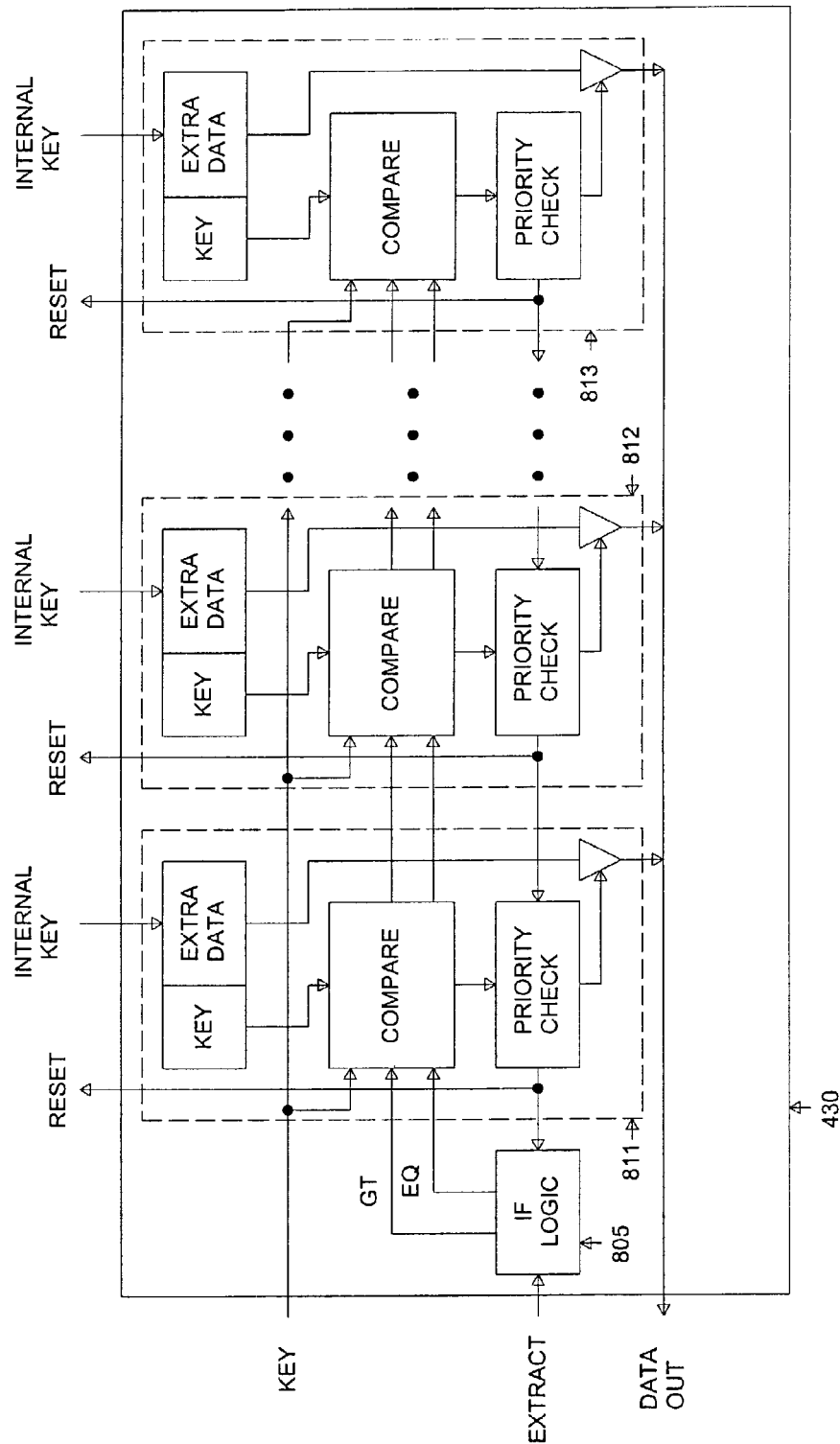
FIG. 8 illustrates an exemplary query block in greater detail according to one embodiment of the present invention.

FIG. 8 illustrates selected portions of query block 430 in greater detail according to one embodiment of the present invention. Query block 430 comprises interface logic 805 and a plurality of comparison blocks, including exemplary comparison blocks 811, 812 and 813. Full associativity is obtained through the comparison logic blocks on the sorting key field. Exemplary comparison block 811 comprises a Compare block, and Priority Check block, and a tristate line driver. Exemplary comparison blocks 812 and 813 have similar structures. The Compare blocks implement compare functions for Equality (EQ) comparisons and for Greater Than (GT) functions. The number of Compare blocks matches the number 3*M of registers in the M PEs from storage sorter block 420 described above. This number may be reduced by carefully analyzing the operating mode and the constraints on execution.

The Priority Check block decides, in case of multiple matches, which value is the correct output result. As a general rule, the small value positions have priority when using, as in the current example, a descending order storage sorter 420. Therefore, the rightmost Comparison block has highest priority. Each Priority Check block receives all the previous comparison results (or a composite signal) from the cells to the right and applies some decision function.

Interface logic block 805 generates the signal of the operation to be performed, starting from the equality comparison. The Equality (EQ) signal and the Greater-Than (GT) signal are propagated unchanged along the whole array of cells. Interface logic block 805 receives information about the status of the Equality query and if no signal is asserted (meaning that no matching key has been found in the sorted data set), interface logic block 805 sets the GT signal for the Greater Than comparison to be performed starting from the next clock cycle.

Figure 9:
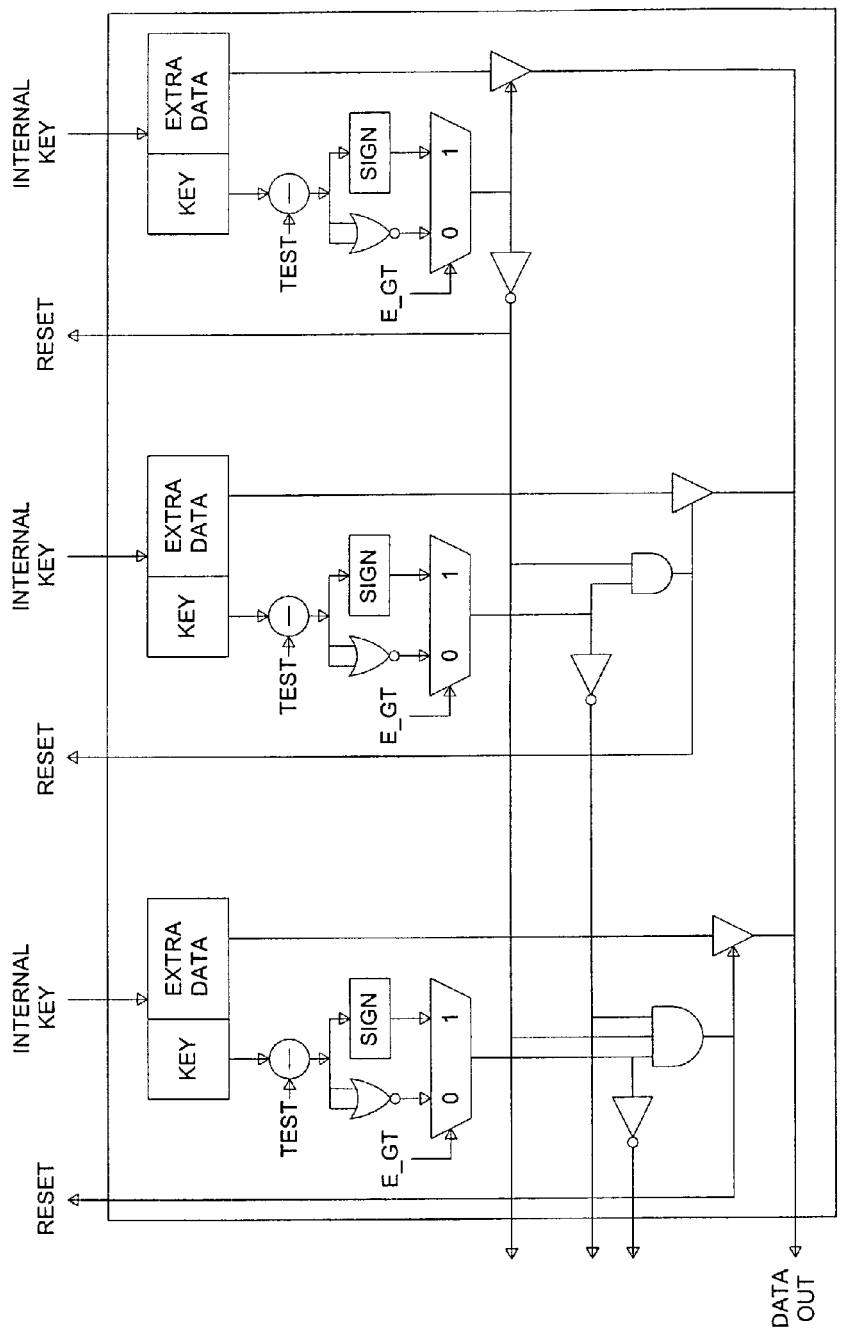
FIG. 9 illustrates the internal structure of the compare blocks in the query block in FIG. 8 in greater detail according to one embodiment of the present invention.

FIG. 9 illustrates selected portions of the internal structure of the Compare blocks and Priority Check blocks in query block 430 in FIG. 8 in greater detail according to one embodiment of the present invention. FIG. 9 shows the logic attached to each register containing the internal key state values from the sorter processing elements (either Xi, Yi or Zi), for the rightmost cell ($PE_{M-1}$ with the highest priority in ascending storage sorter 420 with M PEs). This is an example of only one possible priority mechanism. The priority for other cells may be evaluated through AND gates. The worst-case critical path is the 3-M input AND gate on the leftmost Compare block for storage sorter 420 with M PEs. This high fan-in AND gate could be implemented as a hierarchical tree of 2 input gates—obtaining, in the worst case, $\log_2 (3M)$ levels of logic to constrain the critical path.

When the comparison is successful, a reset signal is sent back to the register storing the corresponding data in storage sorter block 420. This is the destructive mechanism in the extraction of data. Storage sorter block 420 then performs an extra reevaluation cycle to keep consistency in the sorted state. A signal is also sent back to interface logic block 610 in storage sorter block 420 to update its internal counter on the data inserted and to proceed with the reevaluation of priority queue 600.

The operations INSERT and EXTRACT in storage sorter block 420 may be implemented by carefully selecting the data values to present at priority queue 600 interface, such as signals Y and Z, shown in FIG. 5 for the leftmost processing element 500 only (i.e., PE0). The INSERT operation of a new value $K_n$ may be implemented setting Y to be +INF and Z to be the new value $K_n$. The EXTRACT operation may be performed by setting both input port Y and input port Z to the −INF value. The extracted value is the maximum value stored in priority queue 600, among the set of inputs that has been inserted. This insertion/extraction mechanism works under the assumption that the registers are initialized to −INF.

The original priority queue 600 requires always applying one of the latter two operations every other cycle. The present invention provides a hold operation for priority queue 600, wherein no new input value is presented on the leftmost PE interface and no value has to be extracted. This mode can be obtained by setting the input Y to have a value +INF and the input Z to have −INF. This No Operation (or hold) mode is not useful if there has not been any change in priority queue 600 and it corresponds to a reevaluation of the previous state.

However, it is important because, through the added interface established with query block 430, modifications to the internal state register may be made, such as when an inner value is extracted through the interface of query block 430. The extraction process from query block 430 sends back a reset signal to the register storing the value, thereby setting it to −INF. Priority queue 600 reaches a non-coherent state, regarding the sorting of the data set, so a re-evaluation phase is needed to restore a clean and correct state. One re-evaluation cycle is sufficient to accomplish this goal (activate once all the PEs).

The Query action is performed through the system extraction interface. The method by which the interface logic of query block 430 sequentializes the comparison requests starting from equality (EQ), followed by greater than (GT), in case the first comparison fails, is one important innovation provided by the present invention. Considering the resource management problem, the optimal choice is the one that grants the minimal resources sufficient to satisfy the request.

Once a value is found and extracted, storage sorter 420 is forced the re-evaluate the stored values, with a No Operation command at its interface.

After a single INSERT operation, priority queue 600 is able to immediately provide in one cycle the maximum of the data set being inserted. Given the systolic nature of the structure, the new data must flow among processing elements 500A-500E for a certain number of evaluation cycles to achieve a complete sort.

Multiple consecutive insertions (every other cycle, in the original model, or every cycle if working on both clock edges) can be performed allowing overlap of the evaluation phases of each value inserted. After the last INSERT operation and before doing an EXTRACT operation through interface logic block 805 of query block 430, priority queue 600 must reach a stable state, meaning that any further evaluation cycle after that will not alter the achieved order. It is noted that of the 3M registers, for an M-stage priority queue 600, only M−1 registers will hold the sorted data, the others are useful to temporarily store and propagate the values, during the sort phase. The registers are the X and Y in even positions PEs, excluding the first PE (only X) and the last PE (only Y, if M is odd). This implies that a simplification in query block 430 would consider only M−1 registers as inputs to only M−1 Compare blocks (instead of 3M). This also simplifies the complexity of the Priority Check block to $\log_2 (M-1)$ levels of logic in the critical path.

Furthermore, it is noted that input register 515 in PE4 (processing element 500E, but in general PE(M−1), with M PEs) always holds −INF, since −INF is always applied to input port X. It also is noted that input register 505 in PE0 (processing element SOA) always hold an infinite value (either +INF or −INF). Therefore, these two registers are not necessary and may be omitted.

Figure 10A:
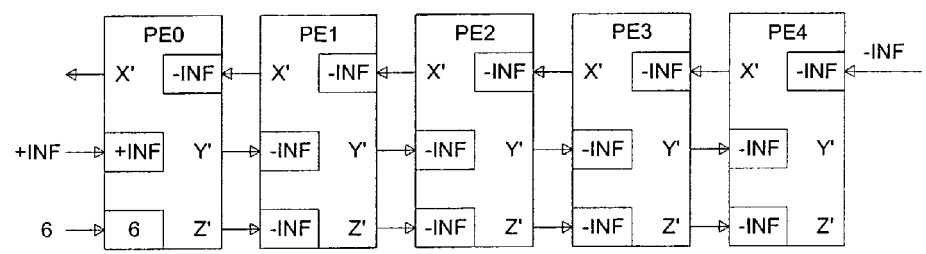
FIGS. 10A-10S illustrate the operation of the priority queue according to the principles of the present invention.
Figure 10B:
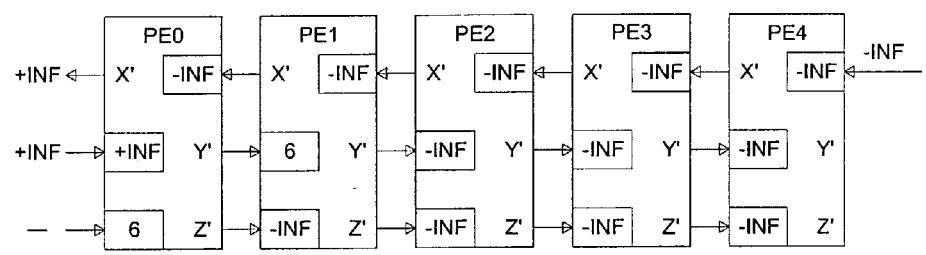
Figure 10C:
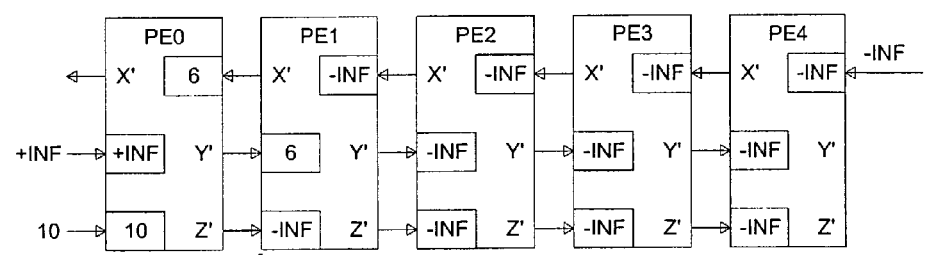
Figure 10D:
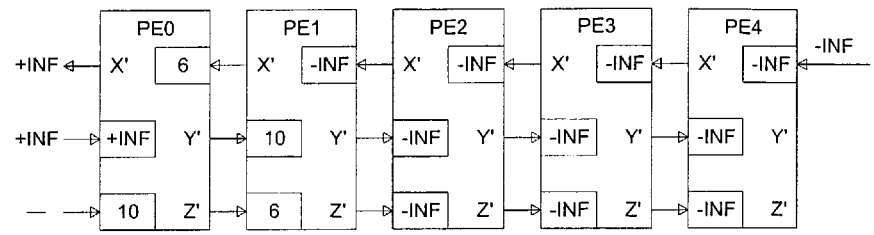
Figure 10E:
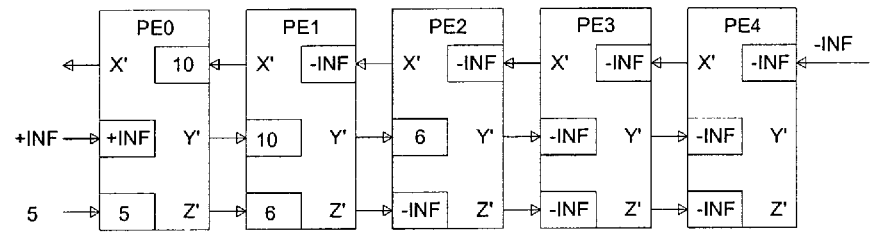
Figure 10F:
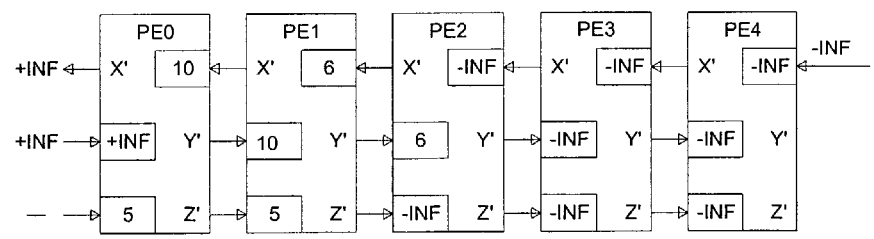
Figure 10G:
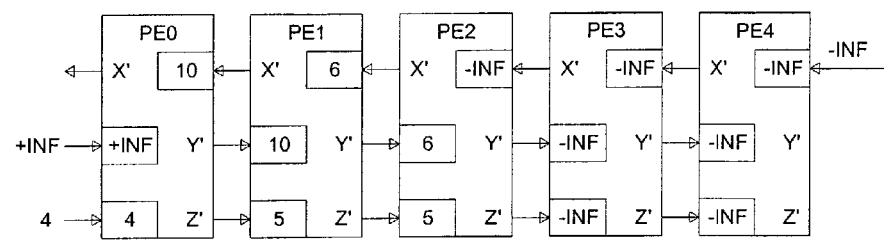
Figure 10H:
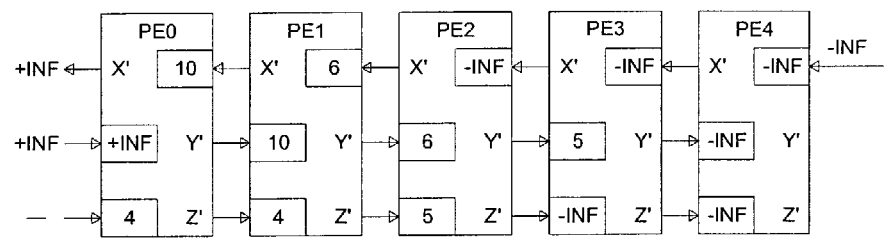
Figure 10I:
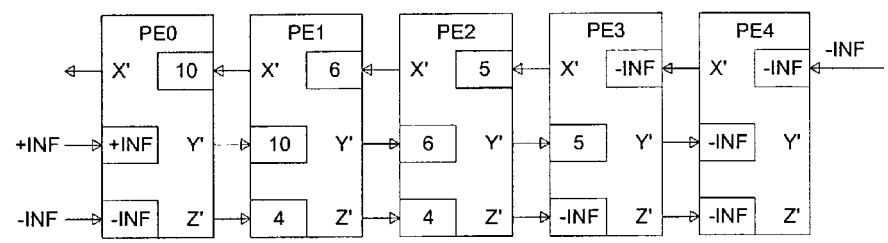
Figure 10J:
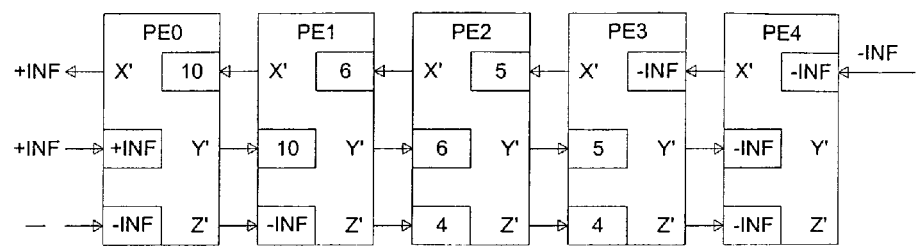
Figure 10K:
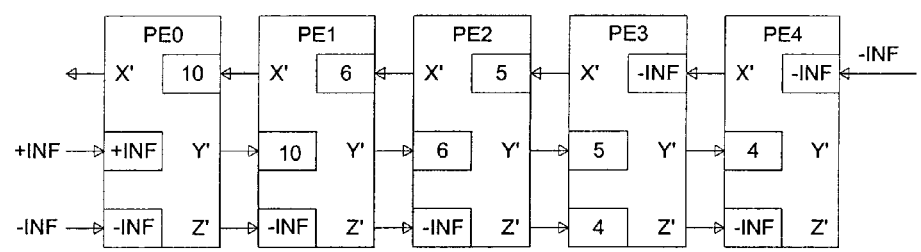
Figure 10L:
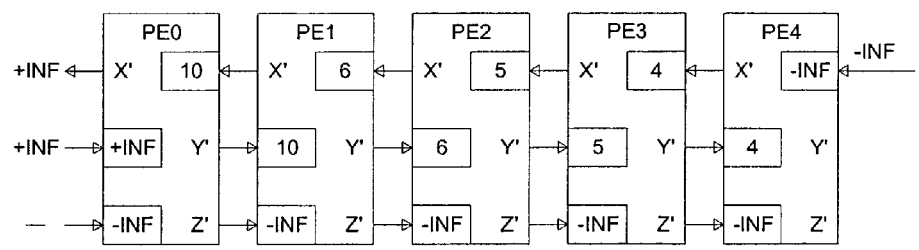
Figure 10M:
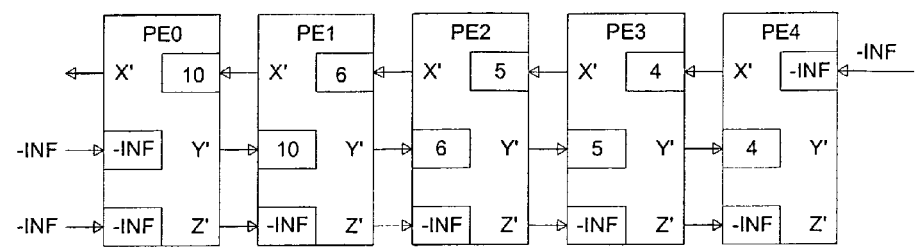
Figure 10N:
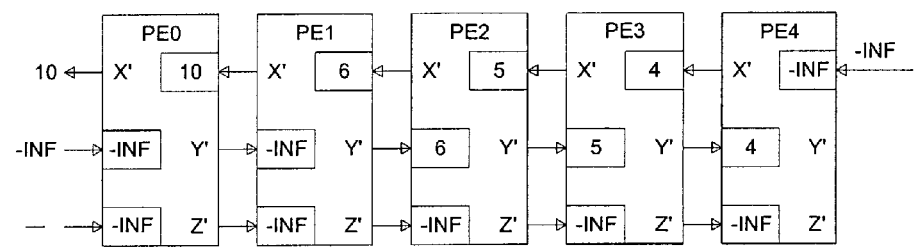
Figure 10O:
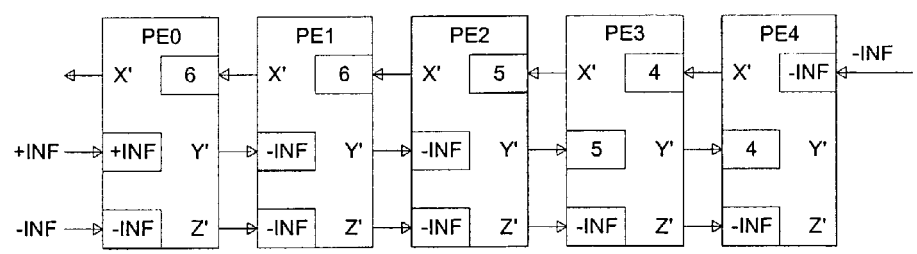
Figure 10P:
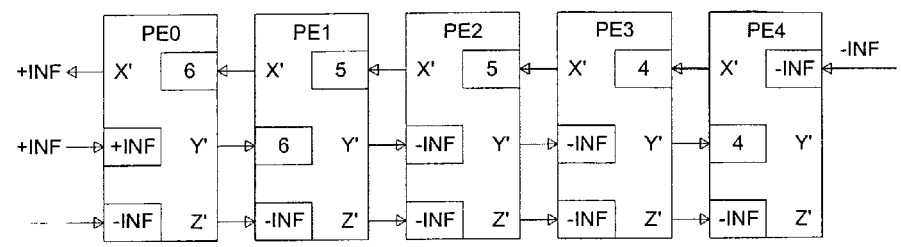
Figure 10Q:
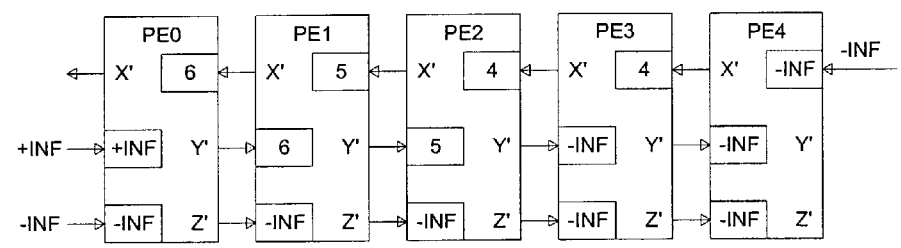
Figure 10R:
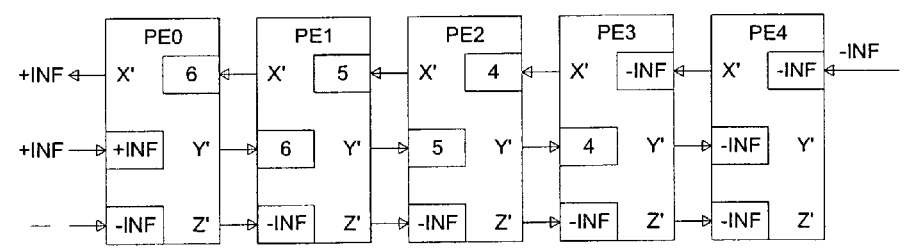
Figure 10S:
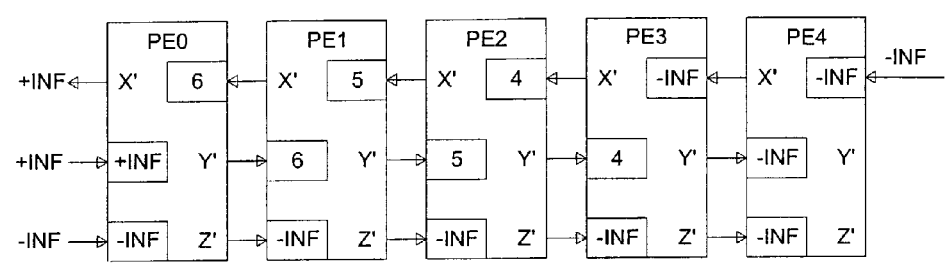

FIGS. 10A-10S illustrate the operation of priority queue 600 according to the principles of the present invention for a simple example of insert and extract operations. It is assumed that extraction of the maximum value is permitted only at the leftmost PE for the sole purpose of illustrating the operating mode of priority queue 600. In the present invention, the extract operation is actually commanded through query block 430, which can extract any inner value.

FIGS. 10A-10S show the effective sorted values in input registers 505, 510, and 515 in processing elements PE0-PE4 during a sequence of operations.

In FIGS. 10A-10S, the sequence of operations is as follows:
1) INSERT 6;
2) INSERT 10;
3) INSERT 5;
4) INSERT 4;
5) HOLD;
6) HOLD;
7) EXTRACT; and
8) HOLD (repeated).

FIGS. 10A and 10B illustrate the INSERT 6 operation. FIG. 10A illustrates the operation of processing elements PE0, PE2, and PE4 during the first execution cycle of the INSERT 6 operation, when the even elements are active. FIG. 10B illustrates the operation of processing elements PE1 and PE3 during the second execution cycle of the INSERT 6 operation, when the odd elements are active.

FIGS. 10C and 10D illustrate the INSERT 10 operation. FIG. 10C illustrates the operation of processing elements PE0, PE2, and PE4 during the first execution cycle of the INSERT 10 operation, when the even elements are active. FIG. 10D illustrates the operation of processing elements PE1 and PE3 during the second execution cycle of the INSERT 10 operation, when the odd elements are active.

FIGS. 10E and 10F illustrate the INSERT 5 operation. FIG. 10E illustrates the operation of processing elements PE0, PE2, and PE4 during the first execution cycle of the INSERT 5 operation, when the even elements are active. FIG. 10F illustrates the operation of processing elements PE1 and PE3 during the second execution cycle of the INSERT 5 operation, when the odd elements are active.

FIGS. 10G and 10H illustrate the INSERT 4 operation. FIG. 10G illustrates the operation of processing elements PE0, PE2, and PE4 during the first execution cycle of the INSERT 4 operation, when the even elements are active. FIG. 10H illustrates the operation of processing elements PE1 and PE3 during the second execution cycle of the INSERT 4 operation, when the odd elements are active.

FIGS. 10I and 10J illustrate the first HOLD operation. FIG. 10I illustrates the operation of processing elements PE0, PE2, and PE4 during the first execution cycle of the first HOLD operation, when the even elements are active. FIG. 10J illustrates the operation of processing elements PE1 and PE3 during the second execution cycle of the first HOLD operation, when the odd elements are active.

FIGS. 10K and 10L illustrate the second HOLD operation. FIG. 10K illustrates the operation of processing elements PE0, PE2, and PE4 during the first execution cycle of the second HOLD operation, when the even elements are active. FIG. 10L illustrates the operation of processing elements PE1 and PE3 during the second execution cycle of the second HOLD operation, when the odd elements are active.

FIGS. 10M and 10N illustrate the EXTRACT operation. FIG. 10M illustrates the operation of processing elements PE0, PE2, and PE4 during the first execution cycle of the EXTRACT operation, when the even elements are active. FIG. 10N illustrates the operation of processing elements PE1 and PE3 during the second execution cycle of the EXTRACT operation, when the odd elements are active.

FIGS. 10O and 10P illustrate the third HOLD operation. FIG. 10O illustrates the operation of processing elements PE0, PE2, and PE4 during the first execution cycle of the third HOLD operation, when the even elements are active. FIG. 10P illustrates the operation of processing elements PE1 and PE3 during the second execution cycle of the third HOLD operation, when the odd elements are active.

FIGS. 10Q and 10R illustrate the fourth HOLD operation. FIG. 10Q illustrates the operation of processing elements PE0, PE2, and PE4 during the first execution cycle of the fourth HOLD operation, when the even elements are active. FIG. 10R illustrates the operation of processing elements PE1 and PE3 during the second execution cycle of the fourth HOLD operation, when the odd elements are active.

Finally, FIG. 10S illustrates the operation of processing elements PE1 and PE3 during the first execution cycle of the fifth HOLD operation, when the even elements are active.

Regarding the delay in number of cycles that is needed before applying an EXTRACT operation, the worst case happens when inserting the new minimum value when priority queue 600 already contains N−1 values (N being the capacity of the queue, without overflow). In this scenario, the delay is exactly N cycles (or N/2 cycles if working with both clock edges).

To execute an EXTRACT operation, the delay can be one clock cycle (assuming this fits the comparison logic in one cycle) if the key is found in the stored data set, or multiple cycles in case the key is not found and a comparison "greater than" is applied. Note that in this latter case, the comparisons do not need to be recomputed again. Since the results are already available from the previous cycle, the results are just switched to the output of the multiplexers shown in FIG. 9, thereby setting the E_GT signal.

The mode of operation may be made faster, if it is acceptable to incur the risk of a sub-optimal result from a query. It is possible to avoid waiting up to N cycles to reach a stable state after an insertion before doing an extract operation. The comparison logic has to be extended to consider in this case all the three registers in the even PEs, slightly increasing the complexity of query block 430 in the number of Compare blocks. In case the query value is among the data stored (Equality comparison), the result is still optimal. The sub-optimal risk comes from a Greater-Than enquiry, since the optimal result potentially may still be propagating to the stable final ordered position. In this case, the value chosen would be the immediately greater value than the optimum, already present in its stable position, among the data set.

Although the present invention has been described with several embodiments, various changes and modifications may be suggested to one skilled in the art. It is intended that the present invention encompass such changes and modifications as fall within the scope of the appended claims.

What is claimed is:

1. For use in a data processing system, a data sorting apparatus comprising:
   a storage sorter capable of storing and sorting a data set according to a defined criteria, the storage sorter comprising a plurality of processing elements, wherein each of said processing elements comprises a plurality of inputs and a plurality of outputs, wherein
      a first output of a first processing element transmits a first value to a first input of a second processing element,
      a second output of the first processing element transmits a second value to a second input of the second processing element,
      a first output of the second processing element transmits a third value to a first input of the first processing element; and
   a query mechanism, comprising a corresponding plurality of comparison blocks, wherein each of said comparison blocks is capable of
      receiving a plurality of intermediate sorted data values from a corresponding processing element of said storage sorter,
      comparing said intermediate sorted data values to at least one key value, and
      extracting a data value from said corresponding processing element of said storage sorter in accordance with said comparison.

2. The data sorting apparatus as set forth in claim 1 wherein said storage sorter comprises a priority queue for sorting said data set, wherein said priority queue comprises M processing elements.

3. The data sorting apparatus as set forth in claim 2 wherein said query mechanism receives said plurality of intermediate sorted data values from a subset of said M processing elements in said priority queue.

4. The data sorting apparatus as set forth in claim 3 wherein said query mechanism comprises a plurality of comparison circuits, each of said comparison circuits capable of detecting if one of said plurality of intermediate sorted data values is equal to said at least one key value.

5. The data sorting apparatus as set forth in claim 4 wherein said each comparison circuit is capable of detecting if one of said plurality of intermediate sorted data values is greater than said at least one key value.

6. The data sorting apparatus as set forth in claim 4 wherein said each comparison circuit is capable of detecting if one of said plurality of intermediate sorted data values is less than said at least one key value.

7. The data sorting apparatus as set forth in claim 4 wherein said query mechanism further comprises a plurality of priority determination circuits, each of said priority determination circuits capable of determining a resulting match according to a defined optimal criteria.

8. The data sorting apparatus as set forth in claim 7 wherein operation of said each comparison circuit eliminates a value from said storage sorter.

9. The data sorting apparatus as set forth in claim 8 wherein said storage sorter updates a status of said storage sorter whenever said each comparison circuit eliminates a value from said storage sorter.

10. A processing system comprising:
a fixed data path comprising a register file; and
a reconfigurable logic unit coupled to said fixed data path, the reconfigurable logic unit comprising a data sorting apparatus, wherein said data sorting apparatus comprises:
a storage sorter capable of sorting a data set according to a defined criteria, the storage sorter comprising a plurality of processing elements, wherein each of said processing elements comprises a plurality of inputs and a plurality of outputs, wherein
a first output of a first processing element transmits a first value to a first input of a second processing element,
a second output of the first processing element transmits a second value to a second input of the second processing element,
a first output of the second processing element transmits a third value to a first input of the first processing element; and
a query mechanism, comprising a corresponding plurality of comparison blocks, wherein each of said comparison blocks is capable of
receiving a plurality of intermediate sorted data values from a corresponding processing element of said storage sorter,
comparing said intermediate sorted data values to at least one key value, and
extracting a data value from said corresponding processing element of the storage sorter in accordance with said comparison.

11. The processing system as set forth in claim 10 wherein said storage sorter comprises a priority queue for sorting said data set, wherein said priority queue comprises M processing elements.

12. The processing system as set forth in claim 11 wherein said query mechanism receives said plurality of intermediate soiled data values from a subset of said M processing elements in said priority queue.

13. The processing system as set forth in claim 12 wherein said query mechanism comprises a plurality of comparison circuits, each of said comparison circuits capable of detecting if one of said plurality of intermediate sorted data values is equal to said at least one key value.

14. The processing system as set forth in claim 13 wherein said each comparison circuit is capable of detecting if one of said plurality of intermediate sorted data values is greater than said at least one key value.

15. The processing system as set forth in claim 13 wherein said each comparison circuit is capable of detecting if one of said plurality of intermediate sorted data values is less than said at least one key value.

16. The processing system as set forth in claim 13 wherein said query mechanism further comprises a plurality of priority determination circuits, each of said priority determination circuits capable of determining a resulting match according to a defined optimal criteria.

17. The processing system as set forth in claim 16 wherein operation of said each comparison circuit eliminates a value from said storage sorter.

18. The processing system as set forth in claim 17 wherein said storage sorter updates a status of said storage sorter whenever said each comparison circuit eliminates a value from said storage sorter.

19. For use in a data processing system, a method for finding available resources comprising the steps of:
sorting a data set in a priority queue comprising N processing elements according to a defined criteria, the data set comprising data values representing available resources, wherein sorting the dataset comprises
transmitting a first value from a first output of a first processing element to a first input of a second processing element,
transmitting a second value from a second output of the first processing element to a second input of the second processing element, and
transmitting a third value from a first output of the second processing element to a first input of the first processing element; and
in each of N comparison blocks,
receiving a plurality of intermediate sorted data values from a corresponding one of the N processing elements;
comparing the plurality of intermediate sorted data values from the N processing elements to at least one key value; and
extracting a data value from the corresponding processing element of the priority queue in accordance with the comparison.

20. The method as set forth in claim 19 further comprising the step of detecting if one of the plurality of intermediate sorted data values is equal to the at least one key value.

21. The method as set forth in claim 20 further comprising the step of detecting if one of the plurality of intermediate sorted data values is greater than the at least one key value.

22. The method as set forth in claim 20 further comprising the step of detecting if one of the plurality of intermediate sorted data values is less than said at least one key value.

* * * * *